United States Patent [19]

Han et al.

[11] 4,254,843

[45] Mar. 10, 1981

[54] ELECTRICALLY POWERED VEHICLE

[76] Inventors: Joon H. Han, 816 Gregorio Dr., Silver Spring, Md. 20901; Tae H. Cho, 19010 Quailvalley Blvd., Gaithersburg, Md. 20760

[21] Appl. No.: 59,130

[22] Filed: Jul. 20, 1979

Related U.S. Application Data

[63] Continuation-in-part of Ser. No. 46,905, Jun. 8, 1979, abandoned.

[51] Int. Cl.³ .............................................. B60K 1/00
[52] U.S. Cl. ............................... 180/165; 180/65 DD; 290/55; 415/2 A
[58] Field of Search ............. 180/65 DD, 65 D, 65 C, 180/65 A, 65 R, 302, 2 A, 165, 54 R; 290/44, 45, 55; 415/2, 3, 4, 116, 117; 416/176 A

[56] References Cited

U.S. PATENT DOCUMENTS

| | | | |
|---|---|---|---|
| 756,372 | 4/1904 | Johnson | 415/2 A |
| 2,078,362 | 4/1937 | Arendt | 180/65 C |
| 2,506,809 | 5/1950 | Nims | 180/65 A |
| 3,374,849 | 3/1968 | Redman | 180/65 DD |
| 3,530,356 | 9/1970 | Aronson | 180/65 D |
| 3,556,239 | 1/1971 | Spahn | 180/65 DD |
| 3,734,222 | 5/1973 | Bardwick | 180/54 R |
| 3,878,913 | 4/1975 | Lionts et al. | 180/65 DD |
| 3,882,950 | 5/1975 | Strohlein | 180/165 |
| 4,002,218 | 1/1977 | Horvat | 180/65 DD |

Primary Examiner—David M. Mitchell
Attorney, Agent, or Firm—Robert H. Epstein

[57] ABSTRACT

An electrically powered vehicle having a bank of batteries supplying electricity to an electric motor driving wheels of the vehicle includes a whirl ventilator system, a clutch system and an automatically operated, engine-generator unit for recharging the batteries. The whirl ventilator system includes housings to produce a whirling air flow rotating a fan to drive an alternator such that air flow from movement of the vehicle generates electricity to charge the batteries. The clutch system includes a clutch mechanism coupling a drive shaft and a driven shaft to impart a driving force to the wheels when the drive shaft is rotated faster than the driven shaft and to couple the driven shaft with a flywheel when the driven shaft is rotating faster than the drive shaft, the flywheel driving an alternator such that momentum of the vehicle causes the alternator to charge the batteries. The automatically operated, engine-generator unit is started to charge the batteries when the level of charge therein has dropped below a predetermined level and stopped when the charge level reaches a second predetermined level.

19 Claims, 8 Drawing Figures

U.S. Patent  Mar. 10, 1981  Sheet 2 of 4  4,254,843
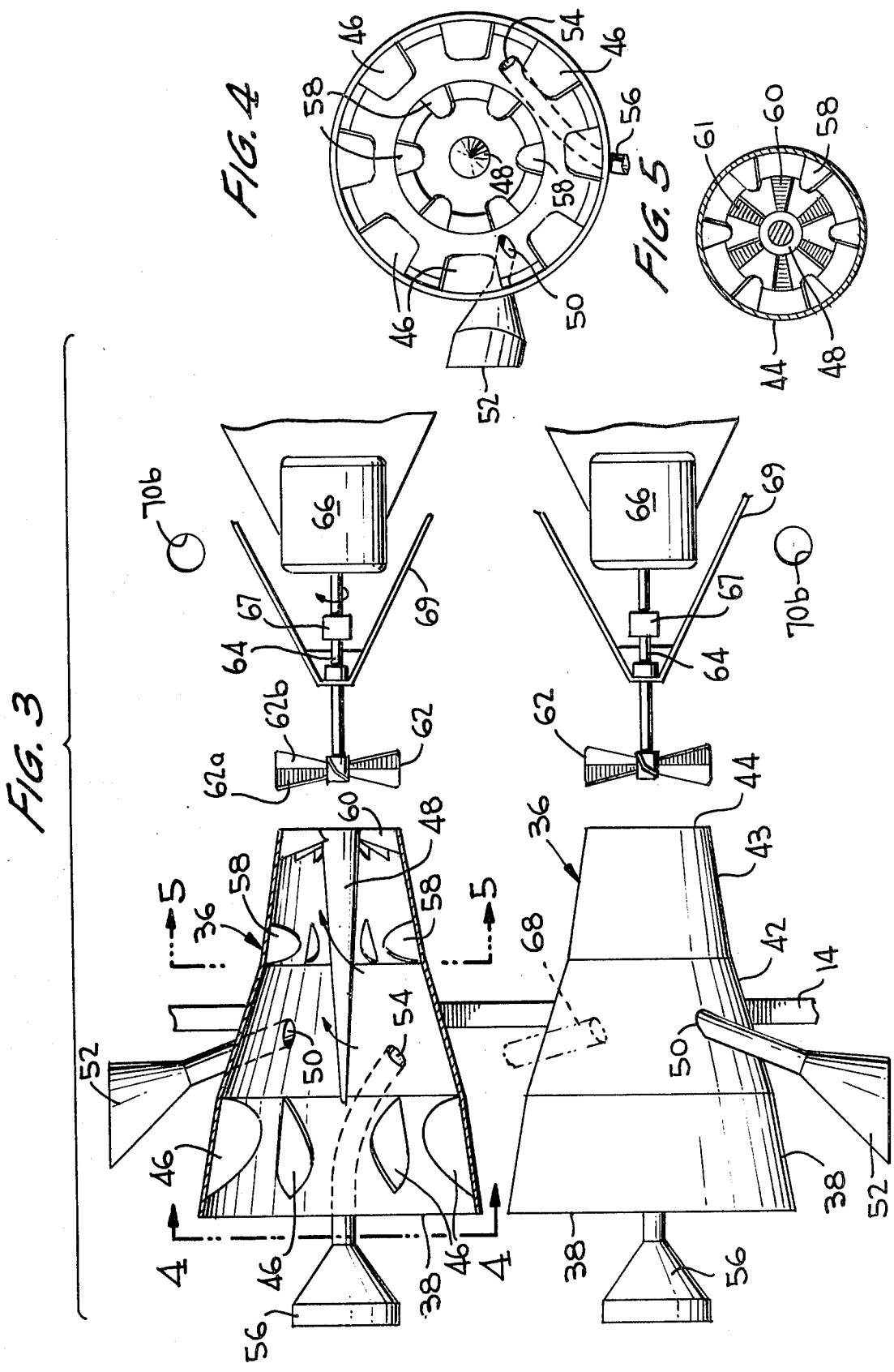

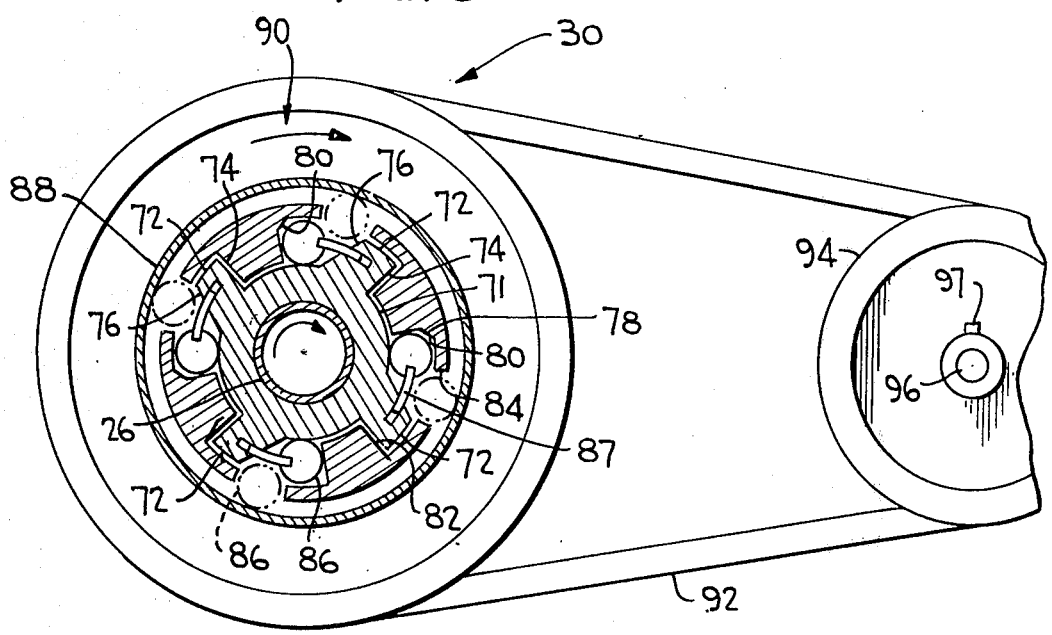
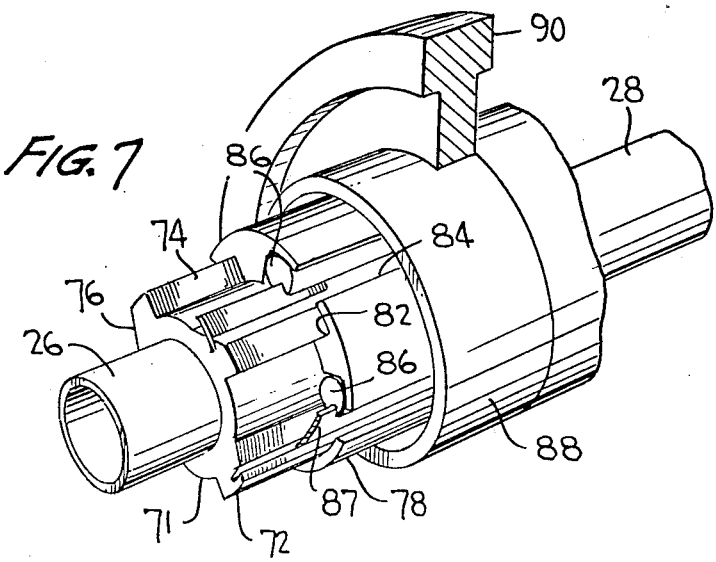

ELECTRICALLY POWERED VEHICLE

RELATED APPLICATION

This application is a continuation-in-part of application Ser. No. 46,905 filed June 8, 1979, now abondoned.

BACKGROUND OF THE INVENTION

1. Field of the Invention

The present invention pertains to electrically powered vehicles and, more particularly, to the charging of batteries utilized to power such vehicles.

2. Discussion of the Prior Art

Electrically powered vehicles conventionally utilize batteries to operate an electric motor for directly turning or rotating the wheels of a vehicle. Electrically powered vehicles have many advantages over vehicles powered by gasoline and other petroleum fuels in that electrically powered vehicles are clean, quiet and easy to operate. Accordingly, it will be appreciated that there recently has been a demand for more acceptable electrically powered vehicles since they produce no exhaust fumes and, therefore, do not add to pollution, they do not reduce petroleum resources and they cost less to operate than gasoline-powered vehicles.

The primary obstacles to widespread acceptance of electrically powered vehicles has been their slow top speed and their limited mileage range, it being desired to have a vehicle be capable of operating on modern highways at speeds of or in excess of 55 miles per hour for emergency situations and to have a mileage range as great as possible to permit use of the vehicle as much as is possible. Prior art electrically powered vehicles have the disadvantages of requiring much down-time for recharging of the batteries, such recharging normally being accomplished overnight by connecting the batteries with available residential or commercial sources of electricity. Recharging of batteries becomes a more serious problem as more batteries are used to increase vehicle speed; and, thus, the use of air flow and vehicle braking as energy sources for recharging have been suggested. These techniques have, however, in the past has the disadvantages of being inefficient and requiring expensive and complicated circuitry and structure.

SUMMARY OF THE INVENTION

Accordingly, it is a primary object of the present invention to overcome the above-mentioned disadvantages of the prior art by providing an electrically powered vehicle efficiently using air flow and vehicle momentum for charging batteries.

Another object of the present invention is to utilize a clutch mechanism operable with the drive shaft of an electrically powered vehicle to drive an electrical generator for recharging batteries when the momentum of the vehicle causes the vehicle to be travelling faster than the rotational drive of the electric motor.

An additional object of the present invention is to utilize a whirl ventilator system mounted on the front of the vehicle for operating an eletrical generator by creating a whirling air flow passing through the vehicle and rotating a fan driving the generator.

The present invention has another object in the use of an automatic generator system carried by the vehicle and including a fuel-powered engine and an electrical generator operable when the current supplied by the batteries drops below a predetermined level.

Some of the advantages of the present invention over the prior art are that the batteries can be recharged during normal operation of the vehicle thereby not requiring the vehicle to be left for long periods of time for recharging of the batteries, recharging of the batteries is accomplished utilizing available energy sources, i.e. wind resistance and air flow and momentum of the vehicle, and the vehicle carries a fuel-powered engine for driving an electrical generator for recharging the batteries when the clutch and whirl ventilator systems are not sufficient therefor.

The present invention is generally characterized in an electrically powered vehicle including a body supporting wheels, a driven shaft supported on the body for rotating the wheels, an electric motor supported by the body rotating a drive shaft, batteries supported by the body supplying electricity to drive the electric motor, an accelerator operable by a driven of the vehicle to control electricity supplied by the batteries to the electric motor to control the speed of rotation of the drive shaft, an electrical generator connected with the batteries for electrically charging the batteries, and a clutch mechanism coupling the drive shaft and the driven shaft including a drive member carried by the drive shaft, a driven member carried by the driven shaft, a flywheel for driving the electrical generator, and a coupling connecting the drive member with the driven member when the drive member is rotating as fast or faster than the driven member and connecting the driven member with the flywheel when the driven member is rotating faster than the drive member whereby the electrical generator is driven to charge the batteries by the momentum of the vehicle.

The present invention is further generally characterized in an electrically powered vehicle including a body supporting wheels, an electric motor rotatably driving the wheels, batteries supported by the body supplying electricity to drive the electric motor, an accelerator operable by a driver of the vehicle to control electricity supplied by the batteries to the electric motor, an electrical generator connected with the batteries for electrically charging the batteries, and a whirl ventilator including a housing having a longitudinal axis, a main inlet for receiving air from the front of the body, and baffles disposed in the housing to impart a whirling motion to the air about the longitudinal axis, and a fan driving the electrical generator including blades to be contacted and rotatably driven by the whirling air whereby air flow through the vehicle is used to drive the electrical generator and charge the batteries.

Other objects and advantages of the present invention will become apparent from the following description of the preferred embodiment taken in conjunction with the accompanying drawings.

BRIEF DESCRIPTION OF THE DRAWINGS

FIG. 3 is a top plan view with parts broken away of the whirl ventilator charging system of the electrically powered vehicle of the present invention.

FIG. 4 is an end view taken along line 4—4 of FIG. 3 showing the whirl ventilator.

FIG. 5 is a section taken along line 5—5 of FIG. 3.

FIG. 6 is a section taken along line 6—6 of FIG. 2 illustrating the clutch mechanism.

FIG. 7 is a broken perspective of the clutch mechanism of FIG. 6.

DESCRIPTION OF THE PREFERRED EMBODIMENT

Figure 1:
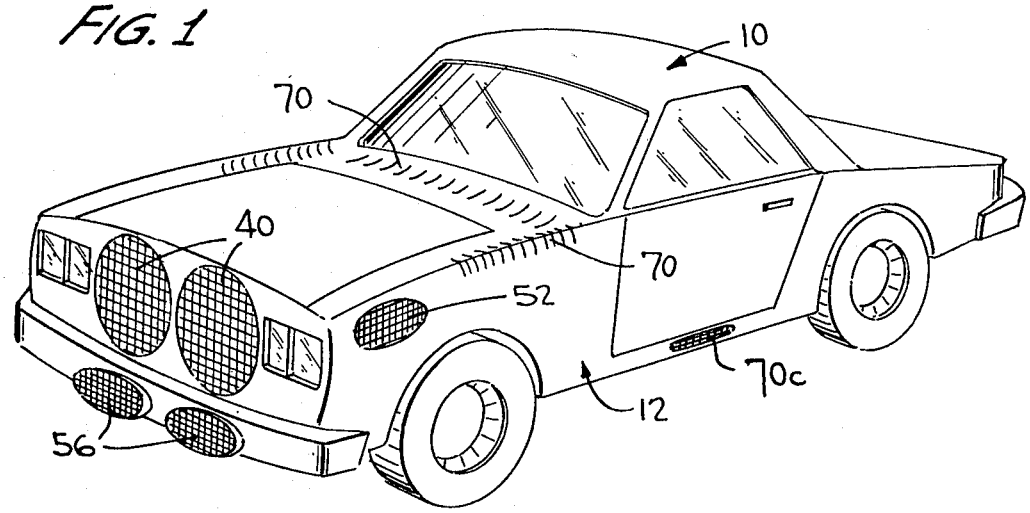
FIG. 1 is a perspective view of an electrically powered vehicle according to the present invention.
Figure 2:
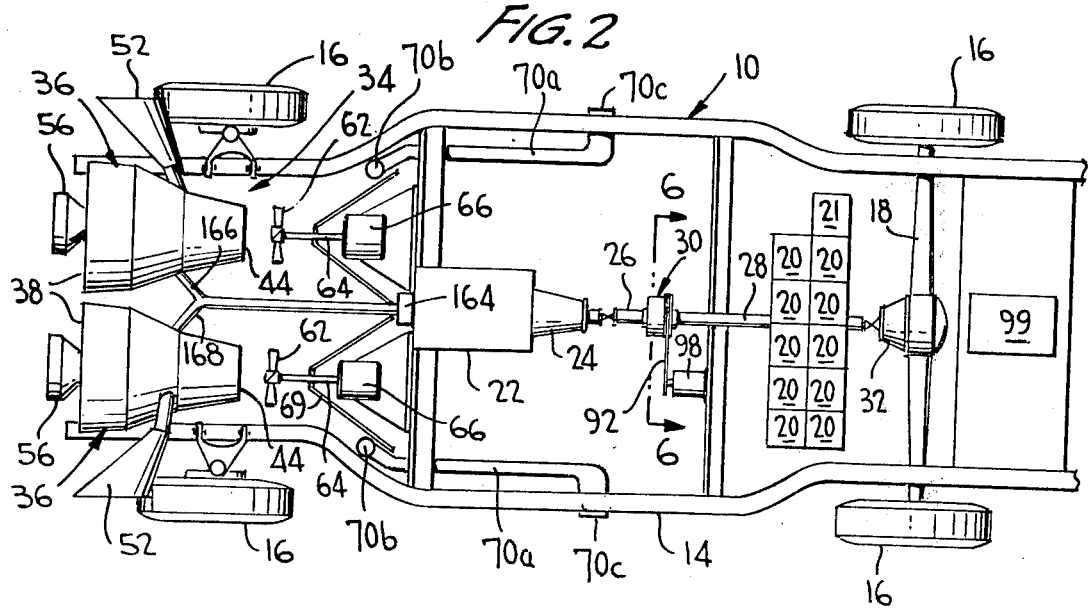
FIG. 2 is a top plan view of the electrically powered vehicle of the present invention.
Figure 8:
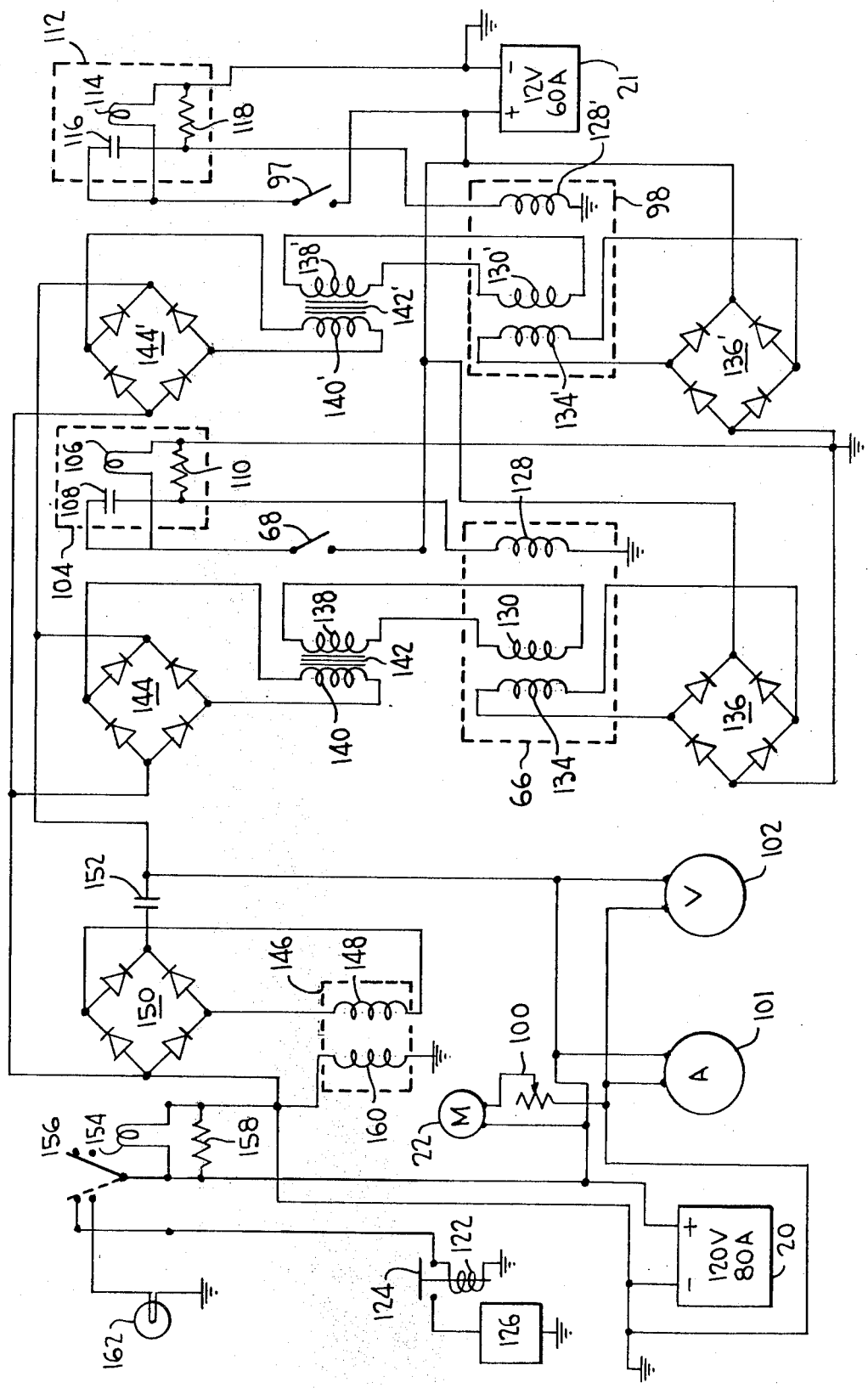
FIG. 8 is a schematic diagram of the electrical system of the subject invention.

An electrically powered vehicle 10 in accordance with the present invention is illustrated in FIGS. 1 and 2 and includes a body 12 having a chassis 14 mounting wheels 16, the rear wheels 16 being mounted on and driven by an axle 18 to propel the vehicle. It will be appreciated that an electrically powered vehicle 10 in accordance with the present invention could be propelled via a front wheel drive system and that the disclosure of a rear wheel drive system is for illustrative purposes only.

A bank of ten 12-volt batteries 20 and a 12-volt accessory battery 21 are mounted on the body 12 of the vehicle toward the rear thereof, the batteries 20 being connected in series to supply 120 volts DC to an electric motor 22 which rotates, through suitable gearing 24, a drive shaft 26. The drive shaft 26 is coupled with a driven shaft 28 via a clutch mechanism 30, and the driven shaft 28 rotates the axle 18 via a conventional differential mechanism 32. With the exception of the clutch mechanism 30, the structure thus far described is conventional, and it will be appreciated that the electrically powered vehicle 10 of the present invention can have any suitable configuration and drive train mechanism.

A whirl ventilator system 34 is positioned at the front of the body of the vehicle 10 and includes housings 36 for channeling air flow therethrough in a whirling pattern, the housings 36 each having a main conical inlet 38 of large diameter communicating with an opening 40 in the grill of the vehicle. From the inlet 38, each of the housings 36 has a central conical portion 42 and an end conical portion 43 reducing the diameter of the housing at an outlet 44. As best illustrated in FIGS. 3, 4 and 5, a plurality of stator baffles or vanes 46 are mounted around the inlet portion 38 at an angle to the longitudinal axis of the housing to produce a whirling or swirling effect on air flowing through the housing, and a conical member 48 is axially mounted in conical portion 43 extending from outlet 44 to the junction of conical portions 38 and 43. A secondary inlet 50 for each housing 36 communicates with an air scoop opening 52 on each side of the vehicle and is positioned in the upper housing, looking at FIG. 3, to direct air tangentially down along the conical portion 42 of the housing, and a secondary inlet 54 is also positioned in the conical portion 42 diametrically opposite the inlet 50 to direct air tangentially up along the conical portion to enhance the whirling of air passing through the housing, the inlet 54 receiving air from an air scoop opening 56 disposed below the main opening 40 in the front of the vehicle. A plurality of angled stator baffles or vanes 58 are arranged in an annular configuration about the longitudinal axis of the housing 36 in the conical portion 43 downstream of the secondary openings, and a baffle structure 60 is disposed at outlet 44 and includes angled, radially arranged blades 61 such that air passing through the housing 36 will have a whirling motion for efficient coaction with the blades of a fan 62 mounted on a shaft 64 extending from the rotor of an electrical generator 66, such as an alternator, the end of conical member 48 directing air away from the hub of the fan.

The blades of fan 62 are each formed of longitudinal sections 62a and 62b angularly arranged such that sections 62b receive full impact of the whirling air to efficiently drive the alternator 66. An electrical switch 67 is mounted on the rotor of alternator 66 and is of a conventional structure to be closed when the rotor is rotating and open when the rotor is stationary. The whirl ventilator on the other side of the vehicle is similar in structure to that specifically described above with the exception that the secondary inlets 50 and 54 are disposed at opposite positions to direct air tangentially in the conical portion 42. While the use of two whirl ventilators is preferred, if there is insufficient space at the front of the vehicle within the hood compartment, a single whirl ventilator can be used with air from both sides of the vehicle supplied to the conical portion 42, as shown in dashed lines at 68, with the front air scoop omitted.

Each of the alternators 66 is shielded by a V-shaped baffle 69 which directs air from the fans 62 out from the hood compartment via grills 70 along the top rear of the hood and the top rear of the front fenders, the baffles 69 also directing air through passages 70a running along both sides of the vehicle and having inlets 70b disposed adjacent the baffles and outlets 70c disposed at the bottom of the vehicle midway between the front and rear wheels. Accordingly, while air flow from movement of the vehicle is used to operate the alternators, air resistance other than for driving the alternators is reduced to a minimum. While the whirl ventilator system is preferably housed in the hood compartment of a vehicle, as shown, if desired, the whirl ventilator housings could be disposed on the roof of a vehicle. Additionally, alternators 66 can be driven by the fan 62 in any suitable manner including the use of belts or chains, and the housings can be modified to have a double-shell structure, and/or to use a fan in front of inlets 38 to enhance whirling motion of the air.

The clutch mechanism 30 is best illustrated in FIGS. 6 and 7 and includes a drive member 71 secured to drive shaft 26 to be rotatable therewith, the drive member 71 having a plurality of lugs 72 protruding substantially radially therefrom with each of the lugs 72 having a leading shoulder 74 and an inclined cam surface 76 opposite the shoulder 74. A driven member 78 is secured to driven shaft 28 to be rotatable therewith and has a plurality of pockets 80 annularly arranged therearound, each pocket receiving one of the lugs 72 of the drive member 70. The pockets 80 each have an internal wall 82 for engagement by shoulders 74 of the lugs to driven the drive shaft 28, and an opening 84 is disposed in the periphery of each pocket to permit a coupling element 86, biased into each pocket by a spring 87, to pass therethrough to engage a cylindrical wall or sleeve 88 of a flywheel 90 around which is entrained a belt 92. The coupling elements 86 are shown as cylindrical rods but can have any configuration suitable for cam-like operation with cam surfaces 76. The belt 92 extends around a pulley 94 mounted on the rotor shaft 96 of an electrical generator 98, such as an alternator, such that when the flywheel 90 is rotatably driven, the alternator 98 will be driven to generate electricity. An electrical switch 97 is mounted on the rotor shaft and is of a conventional structure to be closed when the shaft is rotating and open when the shaft is stationary.

At the rear of the vehicle is mounted an automatically operated fuel-powered engine-generator unit 99 formed of a fuel-powered internal combustion engine driving an electrical generator.

A circuit diagram for the electrically powered vehicle 10 of the present invention is illustrated in FIG. 7 wherein the bank of batteries 20 are illustrated as supplying electricity via potentiometer 100 to electric motor 22, the potentiometer 100 being operated by an accelerator mechanism, such as a pedal, controlled by the drive of the vehicle to vary the speed of operation of the motor and, therefore, the speed of the vehicle. Also connected across the terminals of the battery bank 20 are an ammeter 101 and a voltmeter 102 which are preferably mounted on the dashboard of the vehicle to provide the driver with an indication of the operating characteristics of the battery bank. The accessory battery 21 has a grounded negative terminal and a positive terminal connected via switch 68 with a relay 104 having a coil 106 controlling normally open contacts 108 and a voltage regulating resistor 110 connected between the contacts 108 and ground. Similarly, the positive terminal of accessory battery 21 is connected through switch 97 with a relay 112 having a coil 114 controlling normally open contacts 116, and a voltage regulating resistor 118 is connected between the contacts 116 and ground. A coil 122 is connected to pull in an armature 124 to energize a starter motor 126 for the engine of the engine-generator unit 99 and is supplied with current from battery bank 20 under the control of a current responsive relay as will be described hereinafter.

The alternator 66 has a armature coil 128 connected with battery 21 via contacts 108 and field windings 130 and 134, the winding 134 being connected diagonally across a full wave rectifier 136 having opposite diagonal terminals connected across the accessory battery 21 for charging the same. A primary winding 138 is connected in series with field winding 130 to drive a secondary winding 140 of a transformer 142, the winding 140 being connected diagonally across a full wave rectifier 144 having opposite diagonal terminals connected across battery bank 20 to charge the same. Where two alternators 66 are utilized with the whirl ventilator system, the alternators would be similarly connected in parallel to charge the battery bank 20 and the accessory battery 21. The alternator 98 is connected in a similar fashion to charge battery bank 20 and accessory battery 21, with the components and electrical connections of alternator 98 being given the same reference numbers with primes added.

The fuel-powered engine of unit 99 drives an alternator 146 which has a field coil 148 connected diagonally across a full wave rectifier 150 which has opposite diagonal terminals connected across battery bank 20 via normally closed contacts 152, contacts 152 being controlled by a current responsive relay coil 154 connected with the positive terminal of battery bank 20 which also controls an armature 156 illustrated in its energized position. In its unenergized position, armature 156 supplied current to a lamp 162 to indicate charging of the battery bank 20 via the unit 99 to be in progress and to starter 126 which also includes ignition circuitry for the engine. A voltage regulating resistor 158 is connected in series with an armature winding 160 of alternator 146.

In operation, the driver controls the speed of movement of the vehicle 10 by means of the accelertor potentiometer 100 which controls the speed of rotation of motor 22 and the speed at which driven shaft 28 is rotated via clutch 30, it being noted that, when the speed of rotation of the drive shaft 26 and the drive member 71 is greater than the speed of rotation of the driven shaft 28 and the driven member 78, the shoulders 74 of the lugs will engage the walls 82 of the driven members to couple the drive shaft with the driven shaft. Should it be desired to slow the vehicle or should the vehicle be travelling downhill under the force of gravity, the driven shaft will rotate faster than the drive shaft; and, accordingly, the inclined cam surfaces 76 of the lugs will move counterclockwise, looking at FIG. 6, to force the coupling elements 86 out through the openings 84 in the pockets, as shown in dashed lines, to engage the cylindrical wall 88 of the flywheel thereby turning the flywheel to drive the rotor of alternator 98 and cause switch 97 to close. With the rotor of the alternator turning, the alternator will generate alternating current electricity which, after passing through transformer 142', is full wave rectified and supplied to battery bank 20 and accessory battery 21 for recharging. Once the accelerator potentiometer 100 is operated by the driver to increase the speed of the vehicle, the coupling elements 86 will move back into the pockets in the driven member 78 to release the flywheel and permit positive coupling between the drive member and the driven member, it being appreciated that the momentum of the flywheel will continue its rotation to generate additional current for charging the batteries.

Normal wind resistance and air flow around the vehicle during movement will be channeled through the whirl ventilator system 34 with the air passing through each housing 36 being provided with a whirling flow due to the positioning of the stator baffles 46 and 48 and the tangential alignment of the secondary inlets 50 and 54, the whirling air flow causing rotation of fan 62 to drive the rotor of alternator 66 and close switch 67. With switch 67 closed, the alternator 66 is operable in the same fashion as alternator 98 to charge battery bank 20 and accessory battery 21. The whirling movement of the air produced by the arrangement of baffles and inlets in the housings 36 of the whirl ventilator system 34 produces an efficient drive with the baffle structure 60 oriented relative to the angular orientation of the fan blades 62, and the base of cone 48 prevents air from contacting the hub of the fan blades.

Should the whirl ventilator and clutch systems be unable to maintain a sufficient charge on the battery bank 20 to provide 30 amp current, relay winding 154 will drop out thereby moving armature 156 to a position to energize starter 126 and start the fuel-powered engine to rotate the rotor of alternator 146. Current from field winding 148 is rectified at 150 and supplied to battery bank 20 via contacts 152 for charging, and lamp 162 is energized to indicate that charging via unit 99 is in progress. Once the battery bank 20 produces a 60 amp current, relay winding 154 will pull in armature 156 to open the ignition circuit and stop the unit 99.

The clutch alternator 98 has been found to produce electric current of from 5 to 10 amps for recharging of the batteries while the whirl ventilator system has been found to produce up to 10 amps of recharging current dependent upon the speed of the vehicle and the automatic fuel-powered engine-generator unit produces 30 amps for recharging the batteries.

The whirl ventilator and clutch systems generate sufficient electricity under most circumstances to operate normal electrical vehicle accessories, such as power brakes, power windows, radios, lights, heaters and the like. In order to prevent snow or ice accumulation in the whirl ventilator housings, an electric heater 164 can be operated from the accessory battery 21 to heat air, and the heated air is supplied via pipes 166 and 168 to the conical portions 42 of the housings.

Inasmuch as the present invention is subject to many variations, modifications and changes in detail, it is intended that all subject matter discussed above or shown in the accompanying drawings be interpreted as illustrative and not in a limiting sense.

What is claimed is:

1. An electrically powered vehicle comprising:
 a body supporting wheel means;
 driven shaft means supported on said body for rotating said wheel means;
 electric motor means supported by said body rotating a drive shaft;
 battery means supported by said body supplying electricity to drive said electric motor means;
 accelerator means operable by a driver of said vehicle to control electricity supplied by said battery means to said electric motor means to control the speed of rotation of said drive shaft;
 electrical generator means connected with said battery means for electrically charging said battery means; and
 clutch means coupling said drive shaft and said driven shaft including a drive member carried by said drive shaft, a driven member carried by said driven shaft, flywheel means for driving said electrical generator means, and coupling means connecting said drive member with said driven member and responsive to relative rotational speed of said drive and driven members to connect said driven member with said flywheel means when said driven member is rotating faster than said drive member and to disconnect said driven member from said flywheel means when said drive member is rotating as fast or faster than said driven member whereby said electrical generator is driven to charge said battery means by the momentum of said vehicle.

2. An electrically powered vehicle as recited in claim 1 wherein said flywheel means is adjacent said driven member and said coupling means includes a plurality of pockets in said driven member each having an internal wall at one end thereof and an opening therein facing said flywheel means, a plurality of lugs carried by said drive member each received in one of said pockets and having a shoulder for engaging said internal wall when said drive member is rotating as fast or faster than said driven member and a cam surface opposite said shoulder, and a plurality of bearings each disposed in one of said pockets and movable out of said pockets via said openings to contact said flywheel means upon engagement with said cam surface when said driven member is rotating faster than said drive member to couple said driven member with said flywheel means.

3. An electrically powered vehicle as recited in claim 2 wherein said battery means includes an accessory battery and said electrical generator means includes an alternator having a rotor carrying an armature winding and driven by said flywheel means and normally open switch means connected between said accessory battery and said winding and operable in response to rotation of said rotor to be closed to supply electricity from said accessory battery to said winding.

4. An electrically powered vehicle as recited in claim 1 and further comprising second electrical generator means connected with said battery means for electrically charging said battery means, and ventilator means supported on said body to channel air flow therethrough as said vehicle moves, said ventilator means including fan means rotated by said air flow to drive said second electrical generator means.

5. An electrically powered vehicle as recited in claim 4 and further comprising third electrical generator means connected with said battery means for electrically charging said battery means, and fuel powered engine means driving said third electrical generator means.

6. An electrically powered vehicle as recited in claim 4 wherein said ventilator means has a longitudinal axis and includes baffle means for causing said air flow to whirl about said longitudinal axis.

7. An electrically powered vehicle as recited in claim 6 wherein said ventilator means includes a housing having a main inlet aligned with said longitudinal axis and a secondary inlet arranged to direct air tangentially into said housing.

8. An electrically powered vehicle as recited in claim 7 wherein said baffle means includes a first plurality of stator baffles disposed between said main inlet and said secondary inlet, a second plurality of stator baffles disposed downstream of said secondary inlet and an outlet baffle structure for directing a whirling air flow at said fan means.

9. An electrically powered vehicle as recited in claim 8 wherein said ventilator means includes an opening at the front of said body for supplying air to said main inlet of said housing and an opening along one side of said body for supplying air to said secondary inlet of said housing.

10. An electrically powered vehicle as recited in claim 9 wherein said battery means includes an accessory battery and said second electrical generator means includes an alternator having a rotor carrying an armature winding and driven by said fan means and normally open switch means connected between said accessory battery and said winding and operable in response to rotation of said rotor to be closed to supply electricity from said accessory battery to said winding.

11. An electrically powered vehicle as recited in claim 6 wherein said ventilator means includes air passage means for directing air from said fan means to outlet means external of said vehicle.

12. An electrically powered vehicle as recited in claim 5 and further comprising starter means operable when actuated to start said fuel-powered engine to drive said third electrical generator means and means responsive to current supplied by said battery means to energize said starter means when the current supplied by said battery means drops below a predetermined level and to stop said engine when the current supplied by said battery means reaches a second predetermined level.

13. An electrically powered vehicle comprising:
 a body supporting wheel means;
 electric motor means rotatably driving said wheel means;
 battery means supported by said body supplying electricity to drive said electric motor means;
 accelerator means operable by a driver of said vehicle to control electricity supplied by said battery means to said electric motor means;
 electrical generator means connected with said battery means for electrically charging said battery means; and whirl ventilator means including a housing having a longitudinal axis, a main inlet for receiving air from the front of said body, baffle means disposed in said housing to impart a whirling motion to the air about said longitudinal axis, a secondary inlet for directing air tangentially into said housing to enhance whirling motion of said air, and fan means driving said electrical generator means including blades to be contacted and rotatably driven by said whirling air whereby air flow through said vehicle is used to drive said electrical generator means and charge said battery means.

14. An electrically powered vehicle as recited in claim 13 wherein said whirl ventilator means includes means for introducing heated air into said housing.

15. An electrically powered vehicle as recited in claim 13 wherein said housing has an outlet portion, and said baffle means includes a first plurality of stator baffles arranged around said main inlet and angularly oriented relative to said longitudinal axis, a second plurality of stator baffles arranged around said housing downstream from said secondary inlet and a baffle structure disposed at said outlet portion having angled blades.

16. An electrically powered vehicle as recited in claim 15 wherein said blades of said fan means each have angularly oriented longitudinal sections to be contacted by whirling air from said baffle structure at said outlet portion of said housing.

17. An electrically powered vehicle as recited in claim 13 wherein said whirl ventilator means is disposed at the front of said vehicle and includes openings in the front and sides of said body supplying air to said main and secondary inlets.

18. An electrically powered vehicle as recited in claim 17 wherein said whirl ventilator means includes air passage means for directing air from said fan means to outlet means external of said vehicle.

19. An electrically powered vehicle as recited in claim 17 wherein said whirl ventilator means includes a plurality of said housings and said fan means.

* * * * *